United States Patent
Yu et al.

(10) Patent No.: US 7,527,528 B2
(45) Date of Patent: May 5, 2009

(54) ELECTRICAL CARD CONNECTOR ASSEMBLY

(75) Inventors: Hung-Chi Yu, Tu-cheng (TW); Chien-Jen Ting, Tu-cheng (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 0 days.

(21) Appl. No.: 12/156,796

(22) Filed: Jun. 4, 2008

(65) Prior Publication Data

US 2008/0299830 A1 Dec. 4, 2008

(30) Foreign Application Priority Data

Jun. 4, 2007 (TW) .............................. 96209152 U

(51) Int. Cl.
H01R 24/00 (2006.01)
(52) U.S. Cl. ........................ 439/630; 439/607; 439/489
(58) Field of Classification Search ................. 439/630, 439/634, 607, 489, 540.1
See application file for complete search history.

(56) References Cited

U.S. PATENT DOCUMENTS

| 6,468,101 | B2 | 10/2002 | Suzuki | |
|---|---|---|---|---|
| 6,793,536 | B2 | 9/2004 | Takeyama et al. | |
| 7,112,082 | B2 | 9/2006 | Tsai | |
| 2006/0073736 | A1* | 4/2006 | Valcher et al. | 439/630 |
| 2006/0205278 | A1* | 9/2006 | Kuo et al. | 439/630 |
| 2007/0270038 | A1* | 11/2007 | Liu et al. | 439/630 |
| 2008/0041952 | A1* | 2/2008 | Kang | 235/441 |

* cited by examiner

Primary Examiner—Hien Vu
(74) Attorney, Agent, or Firm—Wei Te Chung

(57) ABSTRACT

An electrical card connector assembly (10) for receiving a first and a cards includes a first card connector (100) and a second card connector (200). The first card connector includes a first housing (12), a plurality of first terminals (21) received in the first housing, and an L-shape shell assembled on the first housing. The first housing associating with the L-shape shell to define a rectangular space. The second card connector (200) includes a second housing (14) extending laterally from the first housing and a plurality of second terminals (22) received in the second housing. The second housing is located in the rectangular space.

13 Claims, 4 Drawing Sheets

ELECTRICAL CARD CONNECTOR ASSEMBLY

BACKGROUND OF THE INVENTION

1. Field of the Invention

The present invention generally relates to an electrical card connector assembly, and more particularly to an electrical card connector assembly for receiving two different kinds of cards.

2. Description of Prior Art

Modern times, the PC card is always used as an external equipment for increase the storage of the electrical consumer products, like Mobile phone, Digital camera, etc. The electrical card connector is used for electrically connecting the PC card and the electrical consumer products. Meantime, as the development of the miniaturization, the internal space of the electrical consumer products is more and more less. Accordingly, how to use the limited internal space to assemble more electrical card connectors becomes a new problem.

Hence, it is desirable to have an improved card connector to overcome the above-mentioned disadvantages of the prior art.

BRIEF SUMMARY OF THE INVENTION

Accordingly, the object of the present invention is to provide an electrical card connector assembly for connecting at least two electrical card, which has a less size.

In order to achieve the above-mentioned object, an electrical card connector assembly receiving cards includes a first card connector and a second card card connector. The first card connector includes a first housing, a plurality of first terminals received in the first housing, and an L-shape shell assembled on the first housing. The first housing associating with the L-shape shell defines a rectangular space. The second card connector includes a second housing extending laterally from the first housing and a plurality of second terminals received in the second housing. The second housing is located in the rectangular space.

Other objects, advantages and novel features of the invention will become more apparent from the following detailed description of the present embodiment when taken in conjunction with the accompanying drawings.

DETAILED DESCRIPTION OF THE INVENTION

Figure 1:
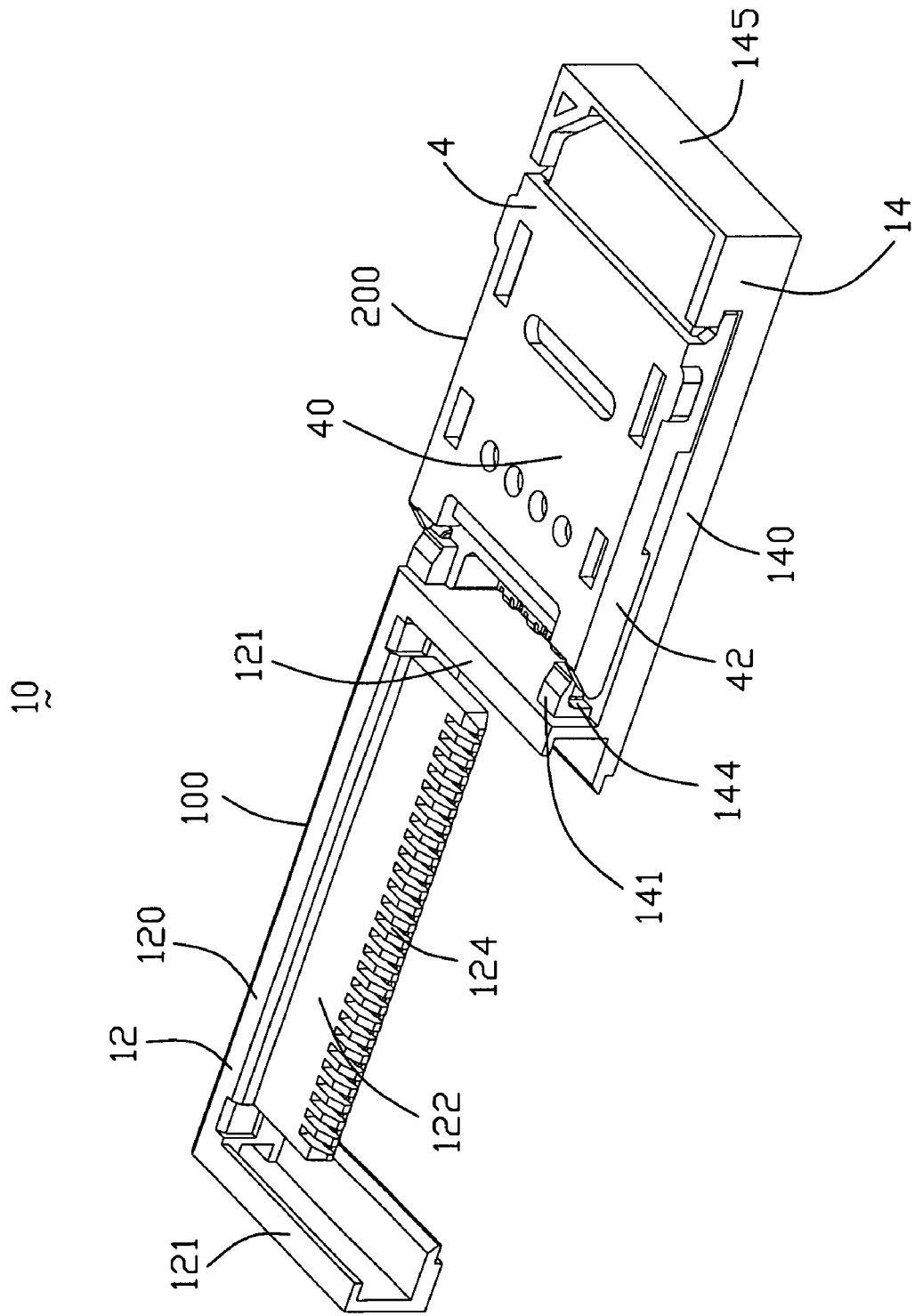
FIG. 1 is a perspective view of an electrical card connector assembly in accordance with the present invention.

Reference will now be made to the drawing figures to describe the present invention in detail.

Figure 2:
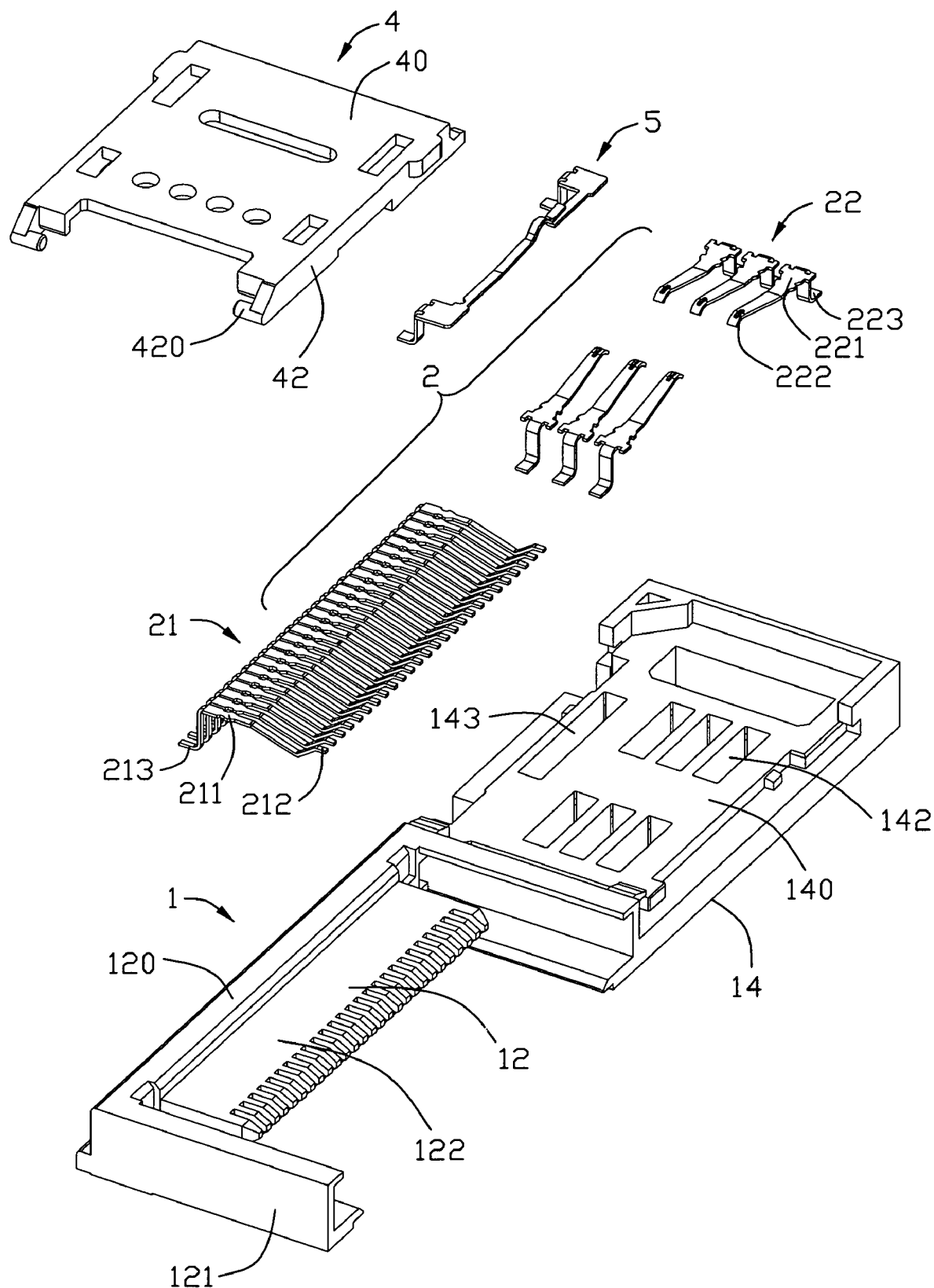
FIG. 2 is an exploded, perspective view of the card connector assembly shown in FIG. 1.
Figure 3:
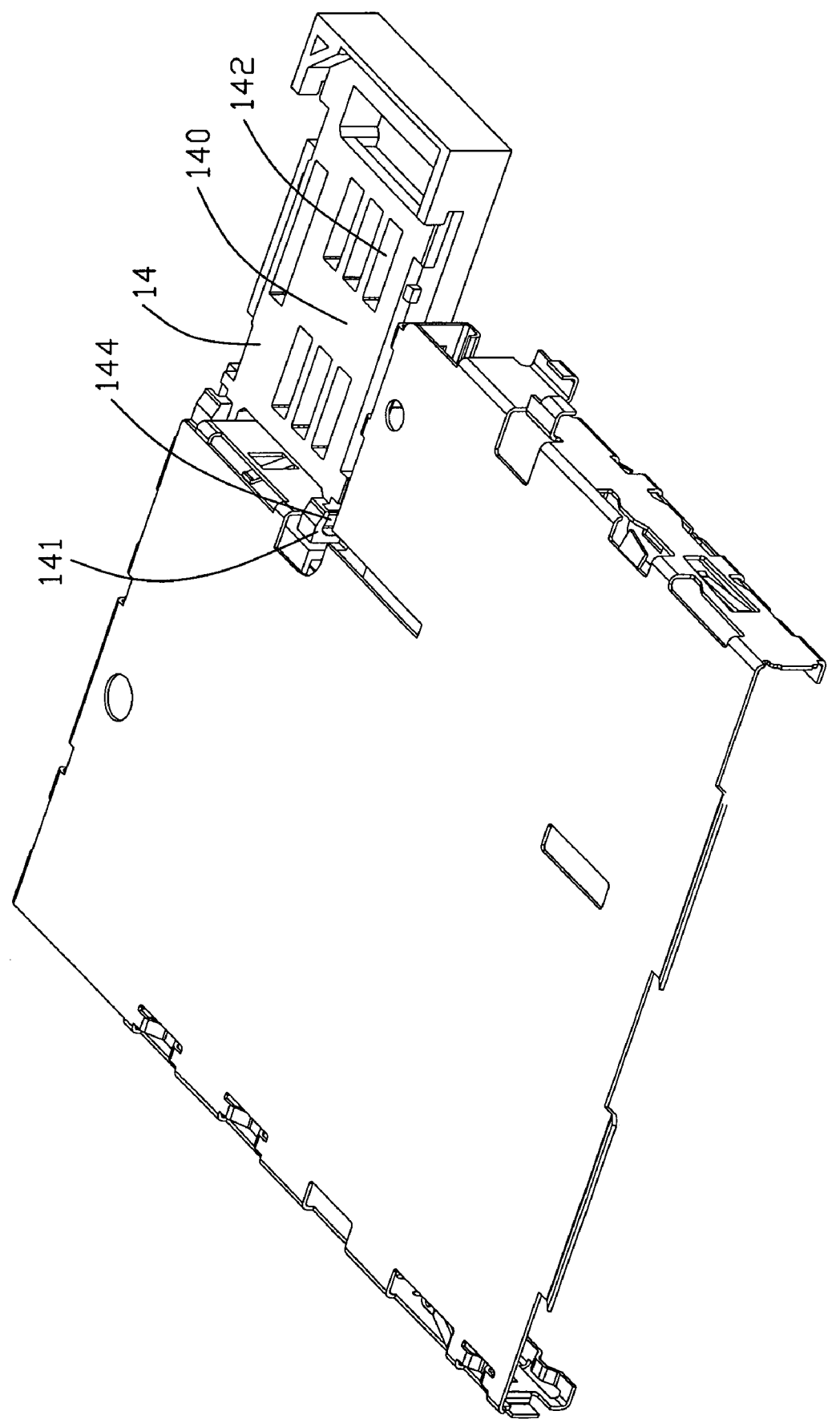
FIG. 3 is a perspective view of an insulating housing of the card connector assembly.
Figure 4:
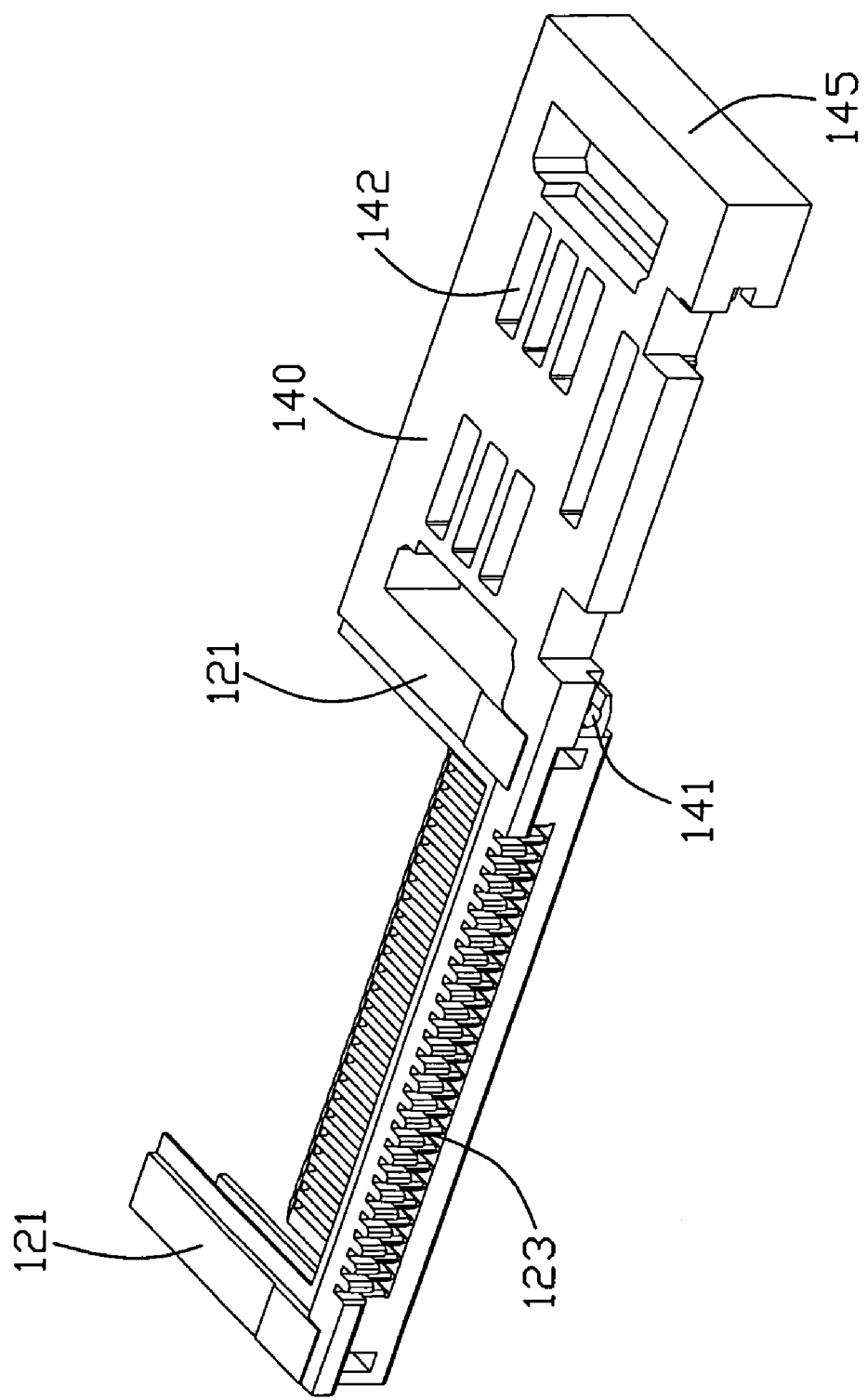
FIG. 4 is similar to FIG. 3, but taken from another view.

Referring to FIG. 1 to FIG. 4, an electrical connector assembly 10 comprises an insulating housing 1 with a plurality of terminals 2 received therein comprising a first insulating housing 12 and a second insulating housing 14 extending laterally from the first insulating housing 12.

The first insulating housing 12 comprises a longitudinal main body 120, a pair of arms 121 extending from the opposite ends of the main body 120, and a tongue portion 122 extending from the main body 120 and sandwiched by the arms 121. The main body 120 defines a plurality of terminal receiving channels 123, and the tongue portion 122 defines a plurality of opening 124 communicating with corresponding terminal receiving channels 123. A plurality of first terminals 21, each of which has a retaining portion 211, a mating portion 212 extending forwardly from the retaining portion 211 and a tail portion 223 extending downwardly from the retaining portion 211 opposite to the mating portion 212, are received in the first housing 12. The retaining portion 211 is retained in the terminal receiving channels 123 of the main body 120, the mating portion 212 is located in the opening 124 of the tongue portion 122, and the tail portion 213 extends beyond the first housing 120 adapted for mounting on a printed circuit board (not shown). Alternatively, a shell is capable of covering on the first housing 12. The first housing 12 and the first terminals 21 together form a first card connector 100 for electrically connecting with the first card (not shown), for example Express card, in a front-to-back direction.

The second housing 14 is approximately configured of rectangle, and comprises a supporting portion 140 extending from one arm of the first housing 1 in a laterally direction perpendicular to the front-to-back direction, a pair of hinges portions extending from the arm of the first housing 1 and arranged in the front-to-back direction, and a stopping portion 145 extending upwardly from the supporting portion 140 opposite to arm 121 of the first housing 12 in the laterally direction. The supporting portion 140 comprises a plurality of cutouts 142 arranged in two rows in the laterally direction and a gap 143 beside the cutouts in the front-to-back direction. Each hinges comprises a camber cavity 144.

The second terminals 22, each of which comprises a mating part 222, a soldering part 223 and a retaining part 221 connecting with the mating part 222 and the soldering part 223. The second terminals are received in the cutouts 142 of the supporting portion with the retaining parts 221 are retained in the supporting portion 140, the mating parts 222 are beyond the top surface of the supporting portion 140, and the soldering part 223 are beyond the bottom surface of the supporting portion 140. A pair of detecting terminals 5 are received in the gap 143 of the supporting portion 140.

A cover 4 rotatablely mounted on the second housing 14, comprises a plate 40, a pair of side walls 42 extending downwardly from the plate 40 and a pair of post 420 extending from each side wall 42, respectively. The posts 420 are retained in corresponding camber cavities 144 of the hinges 141. The second housing 14, the second terminals 22 and the cover 4 are forms a second card connector 200 for electrically connecting with a second card, such as SIM card.

An L-shape shell (shown in FIG. 3) is assembled on the first insulating housing 12 to defines an L-shape card receiving space for receiving the first card. The L-shape shell associating with the first insulating housing 12 defines a rectangular space (shown in FIG. 3). The second insulating housing 14 is located in said rectangular space.

The first card is inserted into the first card connector in the front-to-back direction and the second card is inserted into the second card connector in the laterally direction perpendicular to the front-to-back direction. Thereby, two different card connectors are integral with each other, and saving the external space efficiently.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector assembly for receiving a first and a second cards, comprising:
    a first card connector comprising a first housing, a plurality of first terminals received in the first housing and an L-shape conductive shell assembled on the first housing, the first housing associating with the L-shape conductive shell to define a rectangular space at the lateral side thereof; and
    a second card connector comprising a second housing extending in a lateral direction from the first housing and a plurality of second terminals received in the second housing, the second housing being located in the rectangular space;
    wherein the second card connector comprises a pair of detecting terminals received in the second housing;
    wherein the second housing comprises a supporting portion, a plurality of cutouts being defined on the supporting portion;
    wherein each second terminal is received in a corresponding cutout and comprises a mating part, a soldering part and a retaining part connecting with the mating part and the soldering part, the retaining part is retained in the supporting portion, the mating part extends beyond the top surface of the supporting portion from the cutout, and the soldering part extends beyond the bottom surface of the supporting portion;
    wherein the first card connector mates with the first card in a front-to-back direction perpendicular to the lateral direction, and the second card connector mates with the second card in the lateral direction.

2. The electrical card connector assembly as claimed in claim 1, wherein the first card is different from the second card.

3. The electrical card connector assembly as claimed in claim 1, wherein the second card connector comprises a cover rotatably assembled on the second housing.

4. The electrical card connector assembly as claimed in claim 3, wherein the second card connector comprises a pair of hinges laterally extending from the first housing, each hinge having a camber cavity, and the cover comprises a pair of posts received in corresponding camber cavities.

5. The electrical card connector assembly as claimed in claim 1, wherein the first card is an Express Card.

6. The electrical card connector assembly as claimed in claim 1, wherein the second card is a SIM card.

7. The electrical card connector assembly as claimed in claim 1, wherein the first housing comprises a longitudinal main body, a pair of arms extending from opposite ends of the main body, and a tongue portion extending from the main body between the arms.

8. The electrical card connector assembly as claimed in claim 7, wherein the second housing extends laterally from one of the arms of the first housing.

9. An electrical card connector comprising:
    an elongated insulative housing defining side by side first and second mating ports thereon for respectively receiving first and second cards, said first mating port facing to an exterior in a first direction and said second mating port facing to the exterior in a second direction perpendicular to said first direction;
    an L-shaped conductive shell covering the first mating port to assure the corresponding first card is only allowed to be loaded into the first mating port in said first direction; and
    a cover moveable covering the second mating port for exposing said second mating port to the exterior during loading the second card to the second mating port;
    wherein the elongated housing comprises a pair of detecting terminals received in the second mating port;
    wherein said shell defines a first section and a second section side by side joined with each other under a condition that the first section is aligned with the first mating port in said first direction and the second section is aligned with the second mating port in said first direction;
    wherein said cover is pivotally mounted around the second mating port;
    wherein said housing is essentially of a rectangular piece having a height smaller than both a length and a width thereof under a condition that the height is defined along the second direction and the width is defined in said first direction.

10. The electrical card connector as claimed in claim 9, wherein said cover is pivotally mounted around the second mating port and adjacent to the first mating port.

11. The electrical card connector as claimed in claim 9, wherein the first mating port and the second mating port are essentially dimensioned similar to each other in said first direction.

12. The electrical card connector as claimed in claim 9, wherein said housing defines a similar height at both the first mating port and the second mating port.

13. The electrical card connector as claimed in claim 9, wherein said housing is of an unitary piece.

* * * * *